Figure 1:
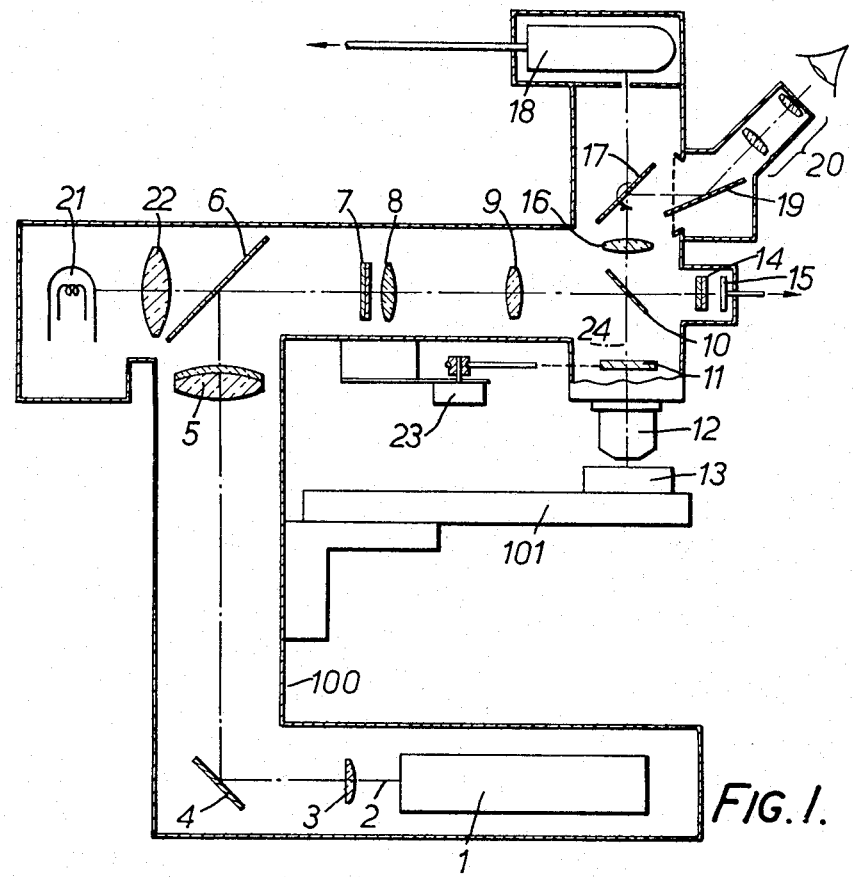

United States Patent [19]

Smith et al.

[11] 3,914,057

[45] Oct. 21, 1975

[54] APPARATUS FOR MEASURING REFLECTIVITY

[75] Inventors: Francis Hughes Smith; Derek Stanley Moore, both of York, England

[73] Assignee: Vickers Limited, London, England

[22] Filed: Oct. 16, 1974

[21] Appl. No.: 515,314

[30] Foreign Application Priority Data
Oct. 17, 1973 United Kingdom............... 48454/73
Jan. 25, 1974 United Kingdom................ 3683/74

[52] U.S. Cl. ................... 356/118; 350/15; 356/209
[51] Int. Cl.² .......................................... G01J 4/00
[58] Field of Search ........ 350/14, 15, 159; 356/118, 356/209; 250/225

[56] References Cited
UNITED STATES PATENTS

| | | | |
|---|---|---|---|
| 2,079,621 | 5/1937 | Land | 350/15 |
| 2,318,705 | 5/1943 | Morgan | 350/15 |
| 3,214,596 | 10/1965 | Schwerdt et al. | 356/209 UX |
| 3,836,787 | 9/1974 | Ash | 356/118 |

Primary Examiner—John K. Corbin
Assistant Examiner—Richard A. Rosenberger
Attorney, Agent, or Firm—Thomas C. Wettach; Arland T. Stein

[57] ABSTRACT

An intense beam of polarised light is passed through selectively controllable polarisation-changing means to be incident in a linearly polarised state upon a specimen under examination. Light of the beam that is reflected at the specimen passes back through the polarisation-changing means to a photodetector.

13 Claims, 4 Drawing Figures

U.S. Patent    Oct. 21, 1975    3,914,057

APPARATUS FOR MEASURING REFLECTIVITY

This invention relates to apparatus for measuring reflectivity.

The measurement of reflectivity of polished coal samples using an incident light microscope is recognised as a useful means of grading coals (e.g. for establishing whether a coal is suitable for converting into a good quality coke for use in high grade steel manufacture). Similarly, reflectance measurements on carbonaceous inclusions in geological sediments can provide important information on oil and gas exploration.

Hitherto it has been extremely difficult to obtain precise reflectivity measurements on these materials. Commonly the polished sample was examined with an incident light polarising microscope under high magnification. The illumination source was normally a filament lamp fed from a stabilised supply. A colour filter or monochromator was inserted in the light path. The light reflected from the specimen was imaged on to an aperture plate. The light which passed through the small aperture in this plate was then detected by a photomultiplier and measured. The aperture permitted small areas (of the order of 1 to 2 $\mu$m diameter) of the specimen to be isolated for the measurement of reflectivity. Since the areas of interest in the specimen typically had reflectivities of the order of 0.5% to 5%, very little light energy was received by the photomultiplier and the signal to noise ratio was low, resulting in low accuracy readings.

A further difficulty arose in that the materials under examination were often anisotropic and, therefore, their reflectivity varied with the direction of the plane of polarisation of the incident light. It was a standard practice to rotate the specimen on a circular stage so that the peak reflectivities could be determined. As many as 100 separate areas on a single specimen were usually examined in this way so that the mean maximum reflectance of the areas of interest might be established. Great care had to be taken in rotating the stage in order to ensure that the specimen surface was not taken out of focus and that the area selected for measurement remained within the measuring aperture.

According to the present invention there is provided apparatus, for use in measuring reflectivity of a specimen, comprising:

a support structure defining a specimen location, for a specimen under examination;

illumination means mounted for providing an intense beam of polarised light, having a predetermined state of polarisation, directed towards said specimen location, to be reflected by such a specimen when the apparatus is in use;

a photodetector mounted for receiving reflected light of the said beam, having undergone reflection at such a specimen when the apparatus is in use, and providing an output signal dependent upon the intensity of the received light;

and selectively controllable polarisation-changing means, mounted at a position optically between said specimen location on the one hand and, on the other hand, both said illumination means and said photodetector, for converting said beam from said predetermined state of polarisation to a linearly polarised state with controlled rotation of the direction of polarisation and for changing the linearly-polarised light, reflected back from said specimen, to a constant state of polarisation, which does not vary as said controlled rotation takes place, when no change in the direction of polarisation of the light is produced by the reflection itself.

The illumination means may employ a high intensity source such as a high pressure gas discharge lamp or, preferably, a continuous laser. Many lasers directly emit linearly polarised light, but a beam having the required predetermined state of polarization may be obtained by placing an appropriate polariser in the path of the beam from any suitable source.

With regard to the polarisation-changing means, various possibilities will be apparent to one skilled in the art. For example, it is well-known that a half-wave birefringent retardation plate has the effect of rotating the direction of linear polarisation of linearly polarised light through twice the angle or rotation imparted to the plate. Thus, in one form of apparatus embodying the present invention a rotatable half-wave plate is employed as the polarisation-changing means. When the light is strictly monochromatic the half-wave plate may, in fact, have a retardation of any integral uneven number of half-wavelengths.

Under consideration also is an alternative form of polarisation-changing means whereby the rotation of the direction of linear polarisation of linearly polarised light is achieved by moving a wedge of optically-active material (.e.g. crystalline quartz cut in such a way that the crystal axis is substantially parallel to the direction of light propagation) in a direction transverse to the direction of light propagation.

The above examples of possible forms of polarisation-changing means require mechanical motion of some form or other. Such motion could be avoided by recourse to electro-optic phenomena wherein birefringence in a crystal is induced or changed by the application of an electric or magnetic field. For example, a crystal of lithium niobate with light passing along its optic axis can be made equivalent to a rotating half-wave birefringent retardation plate by applying alternating voltages in quadrature to its 'a' and 'b' pairs of faces (Rotating Waveplate Optical Frequency Shifting in Lithium Niobate, James P. Campbell & William H. Steier, IEEE Journal of Quantum Electronics, Vol. QE-7, No. 9, Sept. 1971). Clearly such a crystal could be made to perform the required function without the need for moving parts.

Figure 2:
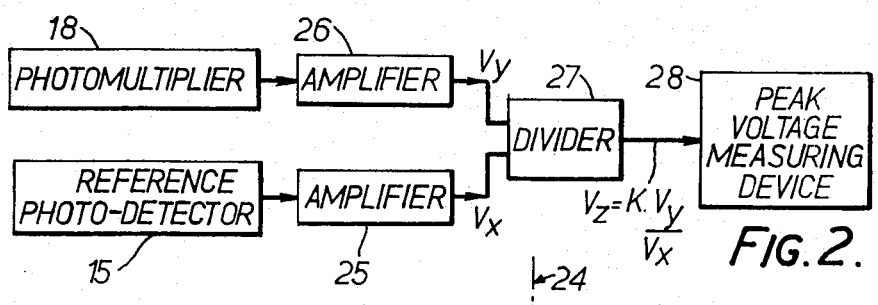
Figures 3, 4:
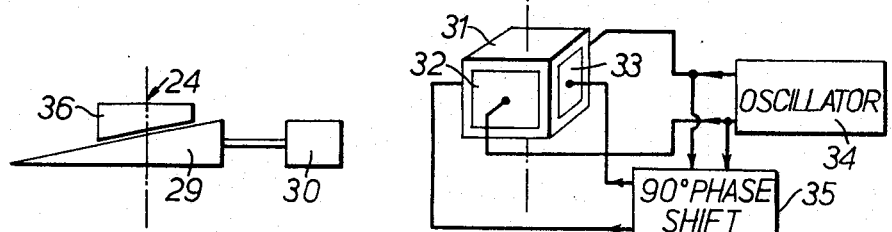

For a better understanding of the invention, and to show how the same may be carried into effect, reference will now be made, by way of example, to the accompanying drawings in which:

FIG. 1 is a schematic diagram of part of an apparatus, embodying the present invention, for measuring reflectivity, FIG. 2 is a block diagram of electrical circuitry for processing electrical signals produced in the apparatus of FIG. 1, FIG. 3 is a diagrammatic side elevation of an alternative form of a portion of the FIG. 1 apparatus, and FIG. 4 shows diagrammatically a perspective view of the second alternative form of the said portion of the FIG. 1 apparatus.

The apparatus illustrated in FIG. 1 comprises a support structure 100 including a platform 101 defining a specimen location, for a specimen 13 under examination. In the support structure 100 is mounted a high intensity light source 1, such as a high pressure gas discharge lamp or, preferably, a continuous-wave gas laser, which generates an intense photometric beam 2 which is focused to a small spot by a lens 3. After passage through the lens 3 the beam 2 is reflected into a vertical path by a mirror 4 towards a first beam-splitter 6 which reflects the beam through a linear polariser 7 to a second beam-splitter 10. A predetermined proportion of the linearly-polarised primary beam 2 is partially reflected by the beam-splitter 10 and thereby directed vertically downwards, to give incident illumination of reflecting specimen 13, through a microscope objective lens 12 and a rotatable birefringement half-wave retardation plate 11 mounted optically between the specimen and the beam-splitter 10. Three lenses 5, 8 and 9 cooperate to image the light spot formed by the lens 3 at the long conjugate of the lens 12, which re-images the light spot at the surface of the specimen 13.

Light reflected from the specimen along axis 24 of the lens 12 returns to the beam-splitter 10 whereby it is partially transmitted to a photo-detector 18, comprising a photo-multiplier, which accordingly produces an electrical signal dependent upon the specimen's effective reflectivity.

If the specimen is birefringent it maximally reflects incident light having a linear vibration direction for which the effective refractive index of the specimen has its maximum value. In practice, this direction varies in accordance with the inherently random orientation of the specimen's structural components. To take-account of the fact, controlled rotation of the direction of linear polarisation is imposed on the incident beam by using an electric motor 23 to rotate the half-wave plate 11. For each revolution of the plate 11 the direction of linear polarisation of the light reaching the specimen 13 rotates through two complete revolutions. This rotation of the direction of linear polarisation of the light reaching the specimen avoids the inconvenience of having to bring anisotropic features of the birefringement specimen into optimum orientation relative to the incident light's azimuth of linear electric vibration by manual adjustment of the specimen on the stage.

As an alternative to the rotatable plate 11, wedges 29 and 36 of like optically active material (e.g. right-handed quartz), as shown in FIG. 3, may be used to provide rotation of the direction of polarisation of the beam passing towards the specimen 13. The wedges 29 and 36 are such that the optic axis of the optically active material is parallel to the axis 24, and translation means 30 are provided whereby the wedge 29 may be moved transversely to the axis 24, while the wedge 36 is stationary, so that different thicknesses of the wedge material may be positioned in the path of the beam, to provide different degrees of rotation of the direction of polarisation of the beam.

As a further alternative an electro-optical crystal 31, arranged as shown in FIG. 4 may be used to provide rotation of the direction of polarisation of the beam passing towards the specimen 13. A first pair of opposite faces of the crystal 31 are provided with respective electrodes 32 (only one of which is seen in the drawing), and a second pair of opposite faces of the crystal are provided with respective electrodes 33. Circuitry comprising an oscillator 34 and a 90° phase shifter 35 supplies voltage signals to the electrodes 32 and 33 such as to effect rotation of the direction of polarisation of the beam as it passes through the crystal.

The rotation of the direction of linear polarisation of the illuminating beam may be effected, by manual rotation of retardation plate 11, or in the alternative case, manual movement of the wedge 29, but it is preferably effected automatically in order to minimise user fatigue and to obviate the risk of accidental displacement of the optical system relative to the specimen. At respective moments when the direction of polarisation of the light incident on a birefringent specimen is orthogonal with the two principal vibration directions of the specimen the incident light suffers no rotation of its direction of polarisation on reflection and therefore returns to the original direction of polarisation (possessed when first incident upon the plate 11) in the course of its second passage through the plate 11. Such a self-compensatory effect can have the valuable advantage of minimising measuring errors arising from residual polarisation effects in the optical system and in the photodetector. The same advantage is attained when the rotatable half-wave plate replaced by a quartz wedge cut with the optic axis of the quartz parallel to the direction of light propagation and mounted to be translated across the beam. The outgoing and returning rotations imparted to the linear polarisation of the light during passage through the wedge would be precisely equal and opposite, and of magnitude dependent upon the thickness of the wedge transversed by the light.

In the interests of simplicity it has thus far been assumed that the light output from the light source 1 remains sufficiently constant for the purposes of precise measurement. However, generally the stability of intensity of high pressure gas discharge lamps and lasers is not in fact adequate for this purpose, and accordingly a secondary photodetector 15, which receives a fixed proportion of the photometric beam, directly transmitted through the beam-splitter 10 so as to be received at the photodetector 15 without having been reflected from the specimen 13, is provided. The output of the photodetector 15 is used for reference purposes in electronic circuitry as shown in FIG. 2. A light filter 14, having a narrow spectral pass band corresponding to the waveband emitted by the source 1, is mounted immediately in front of the secondary photodetector 15 so as to attenuate any extraneous light.

The outputs from the two photodetectors are electronically compared by means of circuitry as shown in FIG. 2. Thus, the output from the Secondary photodetector 15 is amplified by an amplifier 25 to give a voltage $Vx$ which is a measure of the intensity of the photometric beam 2, and the output from the photomultiplier 18 is amplified by an amplifier 26 to give a voltage $Vy$ which is dependent upon both the reflectivity of the specimen and the intensity of the photometric beam 2. The two voltages $Vx$ and $Vy$ are fed to an electric divider circuit 27 to give an output $$Vz = k \frac{Vy}{Vx}$$

(where $K$ is a contant). The output from the divider circuit 27 provides a measure of the reflectivity of the specimen and is substantially independent of variations in the intensity of the photometric beam 2. A peak voltage measuring device 28 is employed to provide a measure of the maximum reflectivity of the specimen as the direction of linear polarisation of the beam incident on the specimen is rotated.

The apparatus as shown in FIG. 1 also comprises a tungsten filament lamp 21 and a condenser lens 22 for illuminating the specimen, for visual examination of the specimen using an eyepiece 20. The lamp 20 is switched off or shuttered during actual measurements of reflectivity. In order to direct an imagebearing light beam into the eyepiece 20, a mirror 17 is swung into its illustrated position to reflect the beam onto a mirror 19 which in turn reflects the beam into the eyepiece.

In a modified form of the apparatus shown in FIG. 1, the component 7 is a circular polariser, of well-known kind, for providing a beam of circularly polarised light, and the component 11 is a quarter-wave plate of known kind. The quarter-wave plate 11 serves to convert the initially incident circularly-polarised light to linearly-polarised light, the direction of polarisation of which rotates at the same speed of rotation as the quarter-wave plate 11. A system of thin optical films may be provided on the reflecting surface of the beam-splitter 10, in known manner, to compensate for the partial linear polarisation effect that would otherwise occur upon reflection at that surface. Reflected linearly-polarised light returning from the specimen, when no change in the direction of polarisation of the light is produced by the reflection at the specimen, is changed back to circularly-polarised light upon passing back through the plate 11 towards the photodetector 18.

We claim:

1. Apparatus for use in measuring reflectivity of a specimen, said apparatus comprising:
   a support structure defining a specimen location, for a specimen under examination;
   illumination means mounted for providing an intense beam of linearly polarised light directed towards said specimen, at said specimen location, to be reflected thereby;
   a photodetector mounted for receiving reflected light of the said beam, having undergone reflection at said specimen and providing an output signal dependent upon the intensity of the received light;
   and selectively controllable polarisation-changing means mounted at a position optically between said specimen location on the one hand and, on the other hand, both said illumination means and said photodetector, for imposing controlled rotation of the direction of polarisation upon said beam directed towards said specimen, whilst imposing equal but opposite rotation, of the direction of polarisation, on said light reflected from said specimen, when no change in the direction of polarisation of said light is produced by the said reflection itself.

2. Apparatus as set forth in claim 1, wherein the said selectively controllable polarisation-changing means comprise a half-wave birefringent retardation plate, and rotatable mounting means mounting said retardation plate for rotation selectively about an axis of said beam between said specimen location and said photo-detector.

3. Apparatus as set forth in claim 1, wherein the said selectively controllable polarisation-changing means comprise a wedge of optically active material, and translatable mounting means mounting said wedge for movement selectively across the said beam.

4. Apparatus as set forth in claim 1, wherein said illumination means include a light source constituted by a continuous laser.

5. Apparatus as set forth in claim 1, wherein said illumination means include a light source constituted by a high pressure gas discharge lamp.

6. Apparatus as set forth in claim 1, wherein the said illumination means include a linear polariser, and a light source mounted to provide a primary beam of light directed to pass through said linear polariser thereby to provide said intense beam of linearly-polarised light.

7. Apparatus as set forth in claim 1, further comprising auxiliary illumination means, for illuminating said specimen alternatively to the illumination means of claim 1, and optical sighting means mounted for viewing said specimen when illuminated by said auxiliary illumination means.

8. Apparatus as set forth in claim 1, wherein the said selectively controllable polarisation-changing means comprise an electrically controlled electro-optical device.

9. Apparatus as set forth in claim 8, wherein the said electrically controlled electro-optical device comprises a lithium niobate crystal mounted to transmit said beam towards said specimen location and to transmit said reflected light towards said photodetector and having its optic axis extending in the directions of transmission therethrough of the beam and reflected light, control electrodes provided at opposite sides of said crystal, and electrical control circuitry connected with said control electrodes for applying control voltages to the said crystal thereby to bring about selected rotation of the direction of polarisation of light undergoing said transmission.

10. Apparatus as set forth in claim 1, wherein said illumination means include a varying-intensity light source, for providing a light output, and means mounted to direct a first predetermined proportion of said light output to form said intense beam;
   said apparatus further comprising a second photodetector, mounted to receive a second predetermined proportion, of said light output, without its having been reflected from said specimen, for providing an output signal which varies in dependence upon variations in intensity of said light output.

11. Apparatus as set forth in claim 10, further comprising a light filter, having a narrow spectral pass-band which includes the spectral range of the light of said first predetermined proportion, mounted to transmit said second predetermined proportion of said light output to said second photodetector.

12. Apparatus as set forth in claim 10, further comprising comparison circuitry, having two inputs connected to receive the respective output signals of the photodetectors, for providing a comparison signal proportional to a ratio of said respective output signals.

13. Apparatus for use in measuring reflectivity of a specimen, said apparatus comprising:
   a support structure defining a specimen location, for a specimen under examination;
   illumination means mounted for providing an intense beam of polarised light, having a predetermined state of polarisation, directed towards said specimen, at said specimen location, to be reflected thereby;
   a photodetector mounted for receiving reflected light of the said beam, having undergone reflection at said specimen, and providing an output signal dependent upon the intensity of the received light;
   and selectively controllable polarisation-changing means mounted at a position optically between said specimen location on the one hand and, on the other hand, both said illumination means and said photodetector, for converting said beam from said predetermined state of polarisation to a linearly polarised state with controlled rotation of the direction of polarisation and for changing the linearly-polarised light, reflected back from said specimen, to a constant state of polarisation, which does not vary as said controlled rotation takes place, when no change in the direction of polarisation of said light is produced by the said reflection itself.

* * * * *